(12) United States Patent
Lee et al.

(10) Patent No.: US 7,742,234 B2
(45) Date of Patent: Jun. 22, 2010

(54) COMPOSITE OPTICAL DIVIDING DEVICE

(75) Inventors: Chi-Hung Lee, Tainan County (TW);
Hsiu-Chen Hsu, Tainan (TW);
Hui-Hsiung Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/365,854

(22) Filed: Feb. 4, 2009

(65) Prior Publication Data
US 2010/0110558 A1 May 6, 2010

(30) Foreign Application Priority Data
Oct. 30, 2008 (TW) ............................. 97141845 A

(51) Int. Cl.
*G02B 27/14* (2006.01)
*G02B 27/10* (2006.01)

(52) U.S. Cl. .................. 359/636; 359/618; 359/634

(58) Field of Classification Search ............ 359/618, 359/619, 622, 625, 626, 634, 636; 353/32
See application file for complete search history.

(56) References Cited

U.S. PATENT DOCUMENTS

| 5,201,268 A | 4/1993 | Yamamoto et al. |
| 5,503,732 A | 4/1996 | Miyazaki et al. |
| 5,682,265 A * | 10/1997 | Farn et al. ................... 359/615 |
| 5,801,795 A * | 9/1998 | Ogino ........................... 349/5 |
| 2002/0001066 A1* | 1/2002 | Kobayashi ................... 353/31 |

FOREIGN PATENT DOCUMENTS

TW         I278395         4/2007

* cited by examiner

*Primary Examiner*—Alicia M Harrington
(74) *Attorney, Agent, or Firm*—Jianq Chyun IP Office

(57) ABSTRACT

A composite optical-dividing component receives a light beam. There are mixed-bands in the light beam. The composite optical-dividing component includes a first optical-patch and a second optical-patch. The first optical-patch has multiple micro-structural lenses in an identical shape. Each micro-structural lens receives the light beam and generates a deflecting light in some degrees of condense. The second optical patch has multiple polygonal structures. Some polygonal structures are periodic and provide the function of deflection in order to receive the deflecting light and then separate multiple bands from the beam. In accordance with wavelengths in multiple bands, the bands are emitted to a target area (RGB) in a plane, respectively. Another part of the polygonal structures has the capability of light refraction, which receives the deflecting light and deflects and the rest of the bands in the beam. And it is emitted to a target area (W) in a plane.

19 Claims, 8 Drawing Sheets

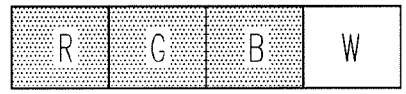
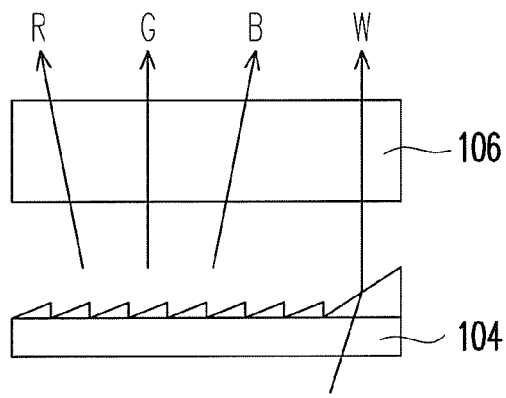
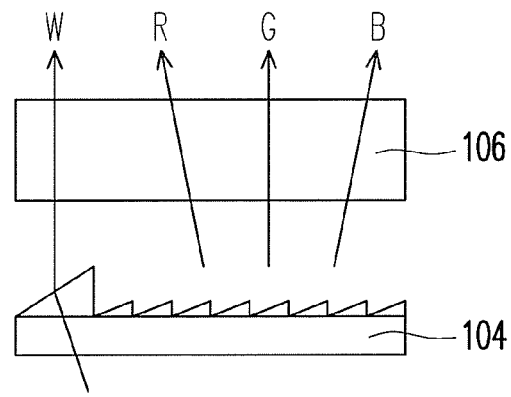
FIG. 5A  FIG. 5B
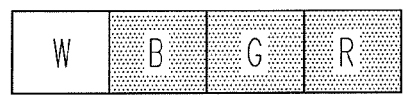
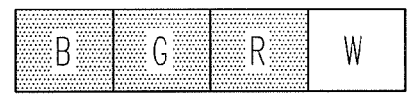
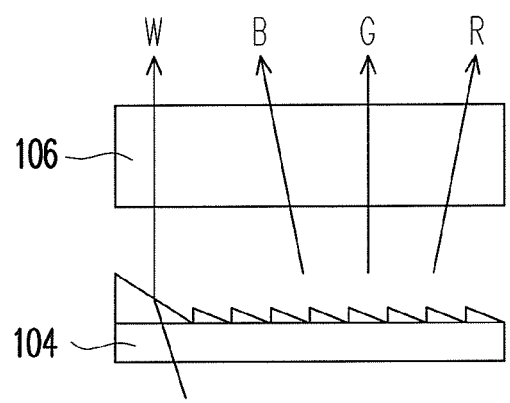
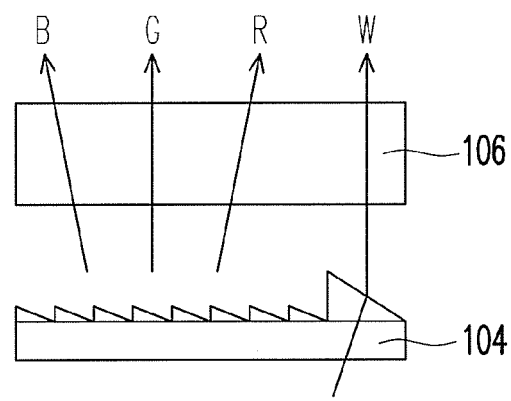
FIG. 5C  FIG. 5D

COMPOSITE OPTICAL DIVIDING DEVICE

CROSS-REFERENCE TO RELATED APPLICATION

This application claims the priority benefit of Taiwan application serial no. 97141845, filed on Oct. 30, 2008. The entirety of the above-mentioned patent application is hereby incorporated by reference herein and made a part of this specification.

BACKGROUND OF THE INVENTION

1. Field of Invention

The present invention relates to a technology of composite optical dividing device, suitable for use in the image apparatus to divide into multiple wavelength bands 2. Description of Related Art The device used in liquid crystal displaying apparatus to mix light is called a color filter (CF). Usually, the transmission lights through three color filters in red, green, and blue are mixed into various colors. The color filter can be fabricated by several different methods, such as color matter dispersion, color dyeing, electro-deposition, printing, and so on.

For massive production, the color matter dispersion is mainly used, but it uses the spin coating and causes the waste of the color photoresist.

Although the electro-deposition method can have large fabrication area in massive production and save the material, the light transparent efficiency is relatively low and can not easily change and match to the requirement of pixels from different customs. U.S. Pat. No. 5,503,732 has provides a method to fabricate the color filter based on electro-deposition method. A transparent electrode circuit is coated on a substrate, and the photolithographic process is performed including steps of light exposure and image development. In other words, the electro-deposition method can have large fabrication area in massive production and save the material. However, the light transparent efficiency is poor and it not easy to have a change to meet the requirement of pixel patterns from different customs.

For the printing method, it has low fabrication cost. However, it has poor reproduction with pixel resolution and pixel location. U.S. Pat. No. 5,201,268 has provides an intaglio printing method for fabricating the color filter. The film thickness is controlled by the trench on the printing plate but it has the disadvantages of poor quality of pixel resolution, smooth surface, and precise control of location. However, since the printing method needs no the photolithographic equipment, the fabrication cost is low in advantage. Taiwan patent I278395 has also provided a surface printing method. However, this surface-printing method has the issue that a texture in concavoconvex pattern exits at the edge of the printing plate. This method is not proper for fabricating into rather small pixels. However, due to no need of photolithographic equipment, the printing method has low fabrication cost.

The dyeing method has better color saturation level but is poor in duration for light and thermal factors. In one of design considerations is not including the dyeing mechanism, so as to avoid the disadvantage of dyeing method.

SUMMARY OF THE INVENTION

The invention provides a composite optical dividing device, which can reduce the fabrication cost and also can allow the incident light to be divided into several primary color lights with respect to the corresponding wavelength bands without the need of color filter, and can be used in color image displaying apparatus. It is to achieve the effect for the specific distribution of RGB without using the convention fabrication processes.

The invention in an aspect provides a composite optical-dividing device, receiving a light beam having multiple wavelength bands in mix, includes a first optical-patch and a second optical-patch. The first optical-patch has a plurality of micro-structural lenses with same shape, the micro-structural lenses receiving the light beam to produce a deflected light with a condensing degree. The second optical-patch has a first region and a second region. The first region has a plurality of periodic polygonal structures and receives a passing portion of the deflected light to divide the wavelength bands. The divided wavelength bands are deflected onto a specific region in a plane, according to individual wavelengths of the wavelength bands. The second region has a polygon structure, receiving a pass portion of the deflected light to deflect onto a specific region on the plane without dividing the wavelength bands.

The invention in an aspect provides a composite optical-dividing device, receiving an incident light beam. The light beam has multiple wavelength bands in mix. The composite optical-dividing device includes an optical having a light input surface and a light output surface. The light input surface has a plurality of micro-structural lenses with same shape. Each of the micro-structural lenses receives the light beam to cause condensation and deflection. The light output surface has a plurality of periodically polygonal structures, for receiving a portion of the incident light beam passing through the light input surface so that the wavelength bands are divided in spacing according to different wavelengths; and another portion is deflected.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5A-5D are cross-sectional views, schematically illustrating the arrangements between the grating structure and the deflecting slant surface in corresponding to the RGBW sub-pixels, according to embodiments of the present invention.

DESCRIPTION OF THE PREFERRED EMBODIMENTS

Figure 1:
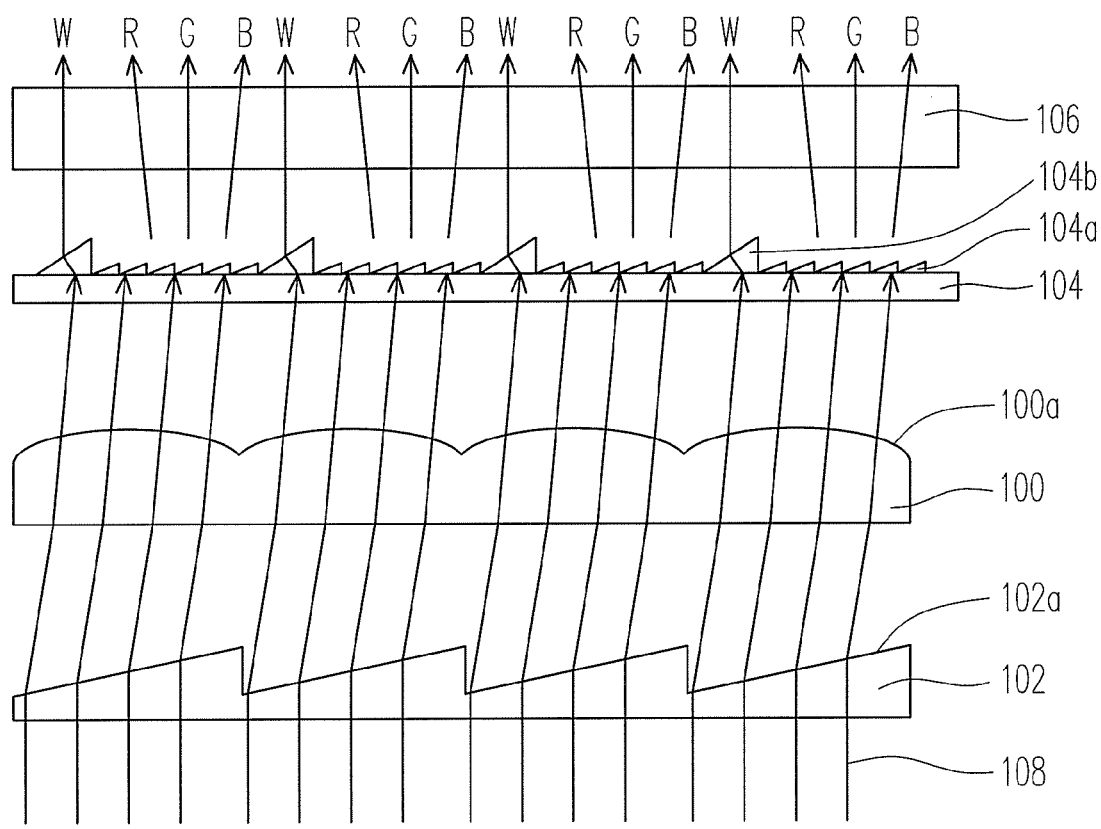
FIG. 1 is a cross-sectional drawing, schematically illustrating composite optical-dividing device with three components, using in image displaying system, according to an embodiment of the invention.

As usually known, a color pixel is formed from several sub-pixels, such as three sub-pixels of R, G, and B, which have individual gray levels to form the desired color. To have a color control with better efficiency, the present invention provides a full pixel with four sub-pixels of R, G, B, and W based on a technology other than the conventional dyeing mechanism, in which W represents white light region. The present invention provides a composite optical-dividing device which needs no color filter and can divide a portion of the incident light beam into several primary color lights, according to different wavelength of the primary color. In the composite optical-dividing device of the invention, the light dividing mechanism is, for example, formed from two optical patches, having periodic polygonal structures. The first periodic structure can, for example, condense the incident light by an intended degree and defect the light traveling direction. The second periodic structure can, for example, split the constitution of different wavelengths in the deflected light source light into a split spectrum, so that the light beam with the different wavelength bands can be divided out in space, according to the different wavelengths. The light beams in the spectrum can be, for example, emitted out at a direction substantially parallel to the original incident direction while another portion of the deflected light is not split in spectrum. However, it is deflected by a refraction structure and then may emit out and keep about parallel to the original incident direction. The invention with the two layers of polygonal structure can have several applications, such as taking place of the color filter in the image displaying panel, image sensing apparatus, or color camera. As a result, it can at least improve the light efficiency in use and reduce the complexity of the original system.

The composite optical-dividing device can basically have two optical component layers. The first layer can have, for example, polygonal structures in periodic arrangement for forming a plurality of micro-structural lenses, so as to properly deflect and condense the passing portion of the light beam. Further, the second layer has a region having periodic polygonal structure, so as to divide the passing portion of the incident light beam onto predetermined directions or positions, according to different wavelength bands based on the diffraction mechanism. The second layer has another portion with polygonal structure to deflect onto predetermined directions or positions, based on the light refraction mechanism. This polygonal structure can be, for example, treated as an individual structure, and therefore can also be referred as a non-periodic structure. The periodic polygonal structure can be, for example, a polygonal optical structure in periodic arrangement, further such as a grating structure. The grating structure can be, for example, a blazed grating, which has both capabilities of dividing light and diffracting light. By adjusting a relative angle of the incident light to the facet of the grating, the direction of diffracted light can be about the same as the refraction direction when the facet is used as the refraction plane. In this situation, the diffraction efficiency at this diffraction direction, or the refraction direction of the facet, can be the maximum, for example.

In addition, the invention, for example, combines the periodic polygonal aspherical lenses with the blazed grating, and can efficiently control to have light beams in batter splitting spectrum without significant changing the light traveling direction. In applications, the invention can, for example, replace the conventional color filter and improve the light efficiency in use. The invention can also further improve the polarization of the incident light. When the invention is in application on a panel or an optical machine system, the light using efficiency can be improved in comparing with the conventional system with color system.

Several embodiments are provided for describing the invention but the invention is not just limited to the provided embodiments. In addition, the provided embodiments can be properly combined to each other.

FIG. 1 is a cross-sectional drawing, schematically illustrating composite optical-dividing device with three components, using in image displaying system, according to an embodiment of the invention. The composite optical-dividing device has, for example, a first optical patch, a second optical patch, and a third optical patch. In the embodiment, the first optical patch 102 can be, for example, a prism plate 102. The second optical patch 100 can be, for example, a micro-structural lens plate 100. The third optical patch 104 can be, for example, formed by a periodic polygonal structure 104a and non-periodic polygonal structure 104b.

The prism plate 102 has several micro-prism units 102a. The micro-prism units 102a receives the light beam 108 to produce a deflect light. In light path shown in drawing is to show the deflecting function to deflect the light traveling direction by a certain degree. The micro-prism units 102a in the prim plate 102 are a polygonal structure, such as a right angle prism.

The micro-structural lens plate 100 has micro-structural lens 100a, corresponding to the micro-prism unit 102a of the prism plate 102. The micro-structural lens 100a is, for example, a lens curving surface symmetric to a central line, further such as a cylindrical surface or spherical surface. The curving surface is to provide the condensing effect but it may need not to actually have the effect to deflect the light. The micro-structural lenses are, for example, implemented at the locations with respect to the pixels on the displaying panel 106, which is behind the micro-structural lenses. The lens unit with column structure or spherical surface can be in one dimensional distribution or two-dimensional distribution. FIG. 1 is just an example for schematically showing the pixels in one scan line.

The third optical patch 104 is formed from polygonal structure units 104a and polygonal structure units 104b. The polygonal structure units 104a are, for example, periodically repeating the structure as a gating. The polygonal structure units 104b are, for example, located between the polygonal structure units 104a. The grating structure can be, for example, blazed grating, which has capability to divide RGB and maintain a high diffracting efficiency. By adjusting the relative angle between the incident light and the slant surface of the grating, the direction of diffracting light can be about the same as the refraction direction when grating facet is treated as the refracting surface. At this direction, the diffraction efficiency can be, for example, a maximum. Further, after the incident light passes the grating facet, it then goes to the locations of the RGB sub-pixels on the displaying panel 106, wherein RGB represents red region (R), green region (G), and blue region (B).

In addition, for another portion of the incident light in passing the polygonal structure unit 104b is deflected, in which the polygonal structure unit 104b is, for example, a deflecting prism having the effect to deflect the light path, such as right-angle prism. By adjusting the relative angle between the incident light and the slant surface of the deflecting prim, the direction of the incident light is deflected and the light emits to the predetermined location of the W sub-pixel, in which W represents a white region, used for adjusting the brightness of the displaying color. In other words, the polygonal structure unit 104b is, for example, just for defecting the light without producing the effect of dividing light. Due to the effect of the polygonal structure units 104a and 104b, the incident light can provide four light of WRGB to four sub-pixels in one pixel. The size of the diffraction region for forming the polygonal structure unit 104a is, for example, about three time of the deflecting region for forming the polygonal structure unit 104b.

Figure 2A:
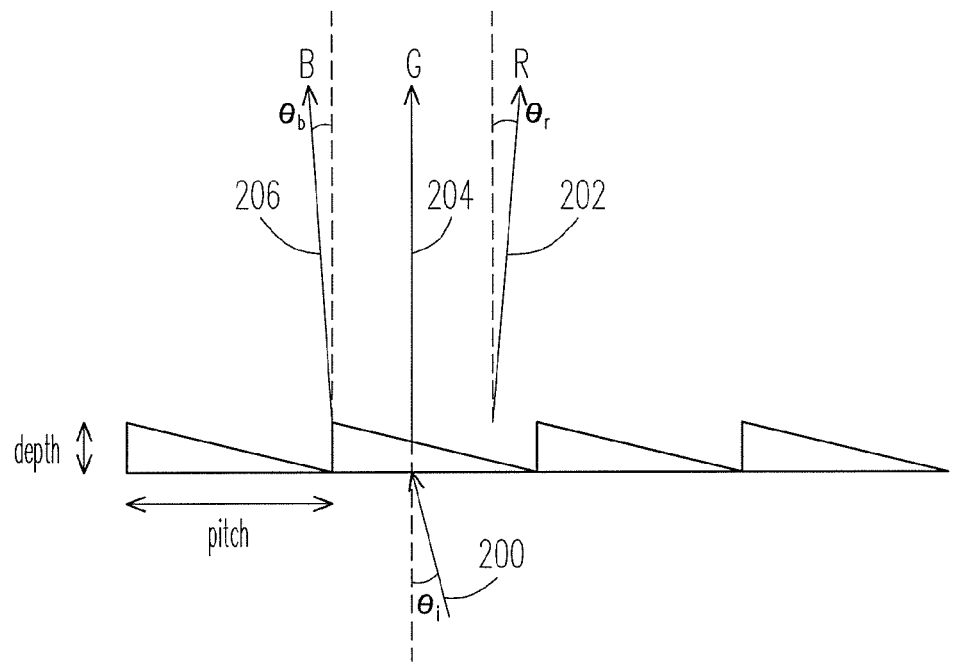
FIGS. 2A and 2B are drawings, schematically illustrating the diffracting mechanism, according to an embodiment of the invention.
Figure 2B:
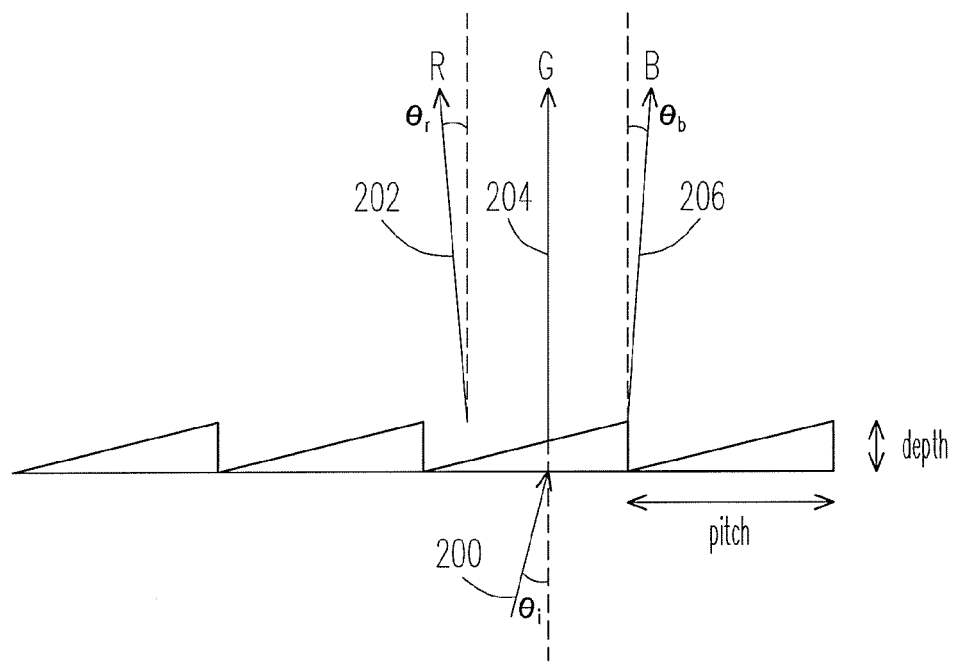

FIGS. 2A and 2B are drawings, schematically illustrating the diffracting mechanism, according to an embodiment of the invention. Taking the grating with the right-angle prism units as an example, the right-angle prism units has fixed pitch. The pitch of the right-angle prism would determine the diffraction angle, and the depth would determine the distribution direction of the diffraction efficiency. For example, when the incident light enters the second set of the periodic polygonal structure, it is divided into three primary lights of RGB. If the pitch is represented as parameter p, wavelengths of the red (R) light 202, the green (G) light 204 and the blue (B) light 206 are respectively represented as kr, kg, and kb. According to the diffraction equation, assuming the incident light is perpendicular incident, then the diffracting angles at the $m^{th}$ order of diffraction for these three color lights are expressed as:

$$\theta_r = \sin^{-1}\frac{m\lambda_r}{p}, \quad \theta_g = \sin^{-1}\frac{m\lambda_g}{p}, \quad \theta_b = \sin^{-1}\frac{m\lambda_b}{p}. \quad (1)$$

Since the incident light is condensed and deflected after passing the first set of periodic polygonal structure, it has an incident angle $\theta_i$ 200. According to the equation (1) and adjusting the parameters, the pitch of the second set of polygonal structure can be controlled so as to deflect each of the emitted color lights back to be about parallel to the original incident direction. In other words, these three color lights are about parallel to each other but separate by a distance, and substantially in perpendicular enter the corresponding pixels on the liquid crystal layer, respectively.

For actual design, in accordance with the need by the system, the shape of periodic polygonal structure can be controlled. For example, in an embodiment as shown in FIG. 2B, a change of the grating structure can also change the distribution sequence of RGB, which is in opposite distribution in comparing with FIG. 2A. For example, when the polygonal structure is polymethylmethacrylate (PMMA) material and has pitch of 4 microns, to form a blazed grating. The index of refraction is about 1.5. For the incident light with incident angle $\theta^i$ 200 is, for example, −7.81°. If the $-1^{st}$ order of the diffraction of the grating is taken, then the depth is set about 1 micron. According to the simulation result, for the incident wavelengths are 436 nm, 544 nm, and 611 nm, the light beam of the $-1^{st}$ order of the diffraction has the efficiency of 75%, 84% & 79%, respectively, and the diffracting angles of $\theta_b$, $\theta_g$, and $\theta_r$ are 1.56°, 0°, and 0.97°. In consideration with the incident angle, the emitting angle can be different in accordance with the actual design. However, it can be, for example, between 0° and 60°.

According to the need of the optical performance as described above, the design of the optical component can be various. Several more embodiments are provided as follows.

Figure 3A:
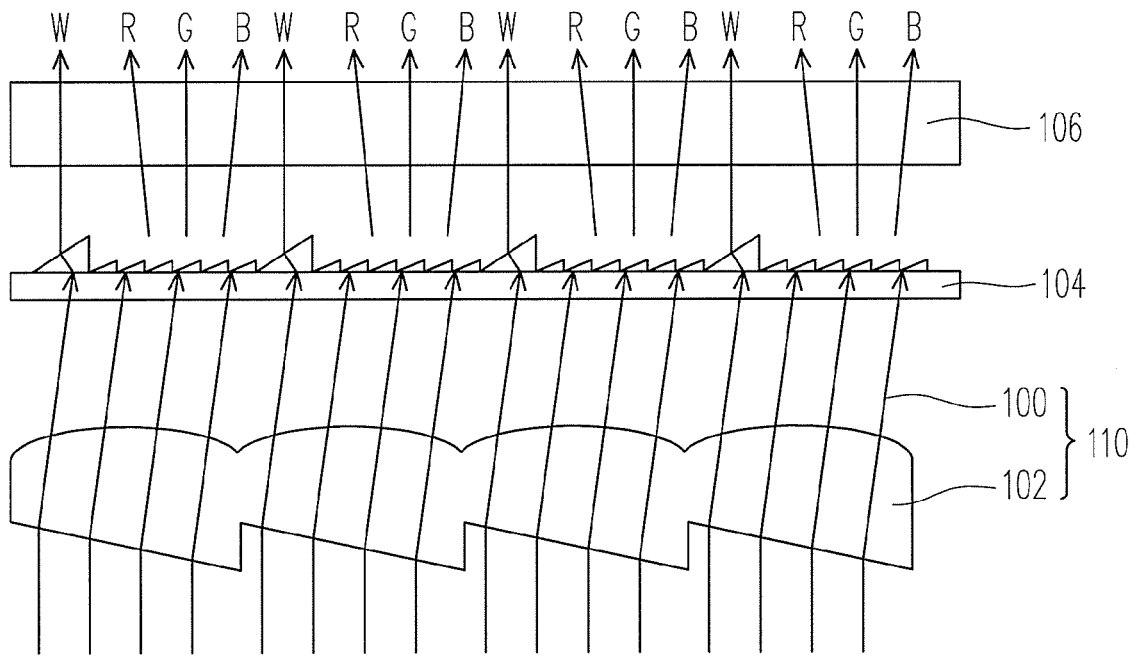
FIGS. 3A-3C are cross-section views, schematically illustrating the application of the composite optical-dividing device with two optical plates in image displaying apparatus, according to an embodiment of the invention.
Figure 3B:
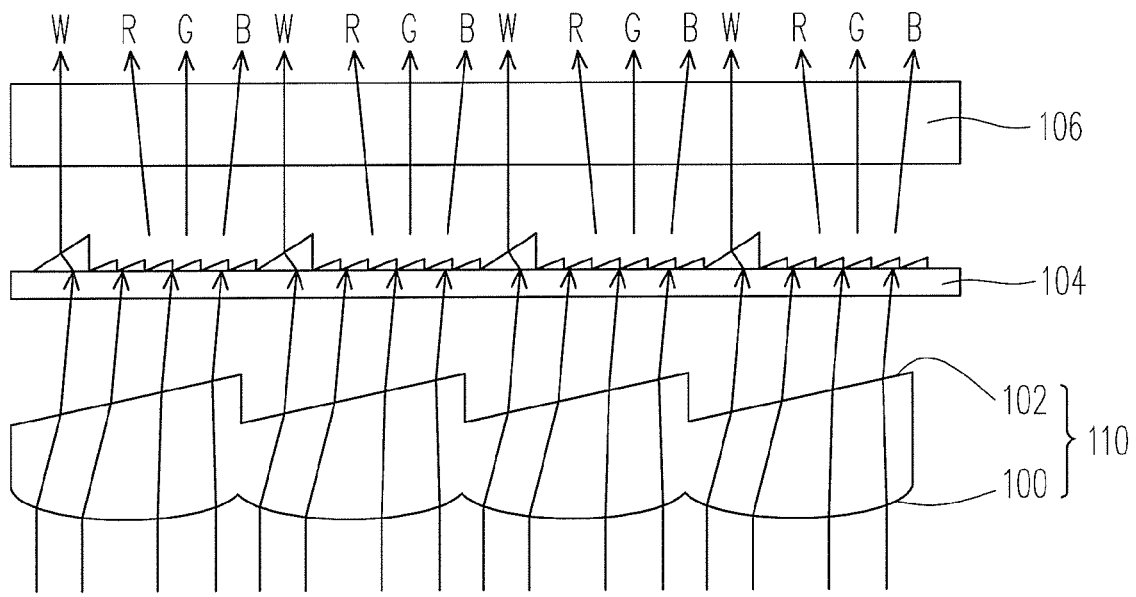
Figure 3C:
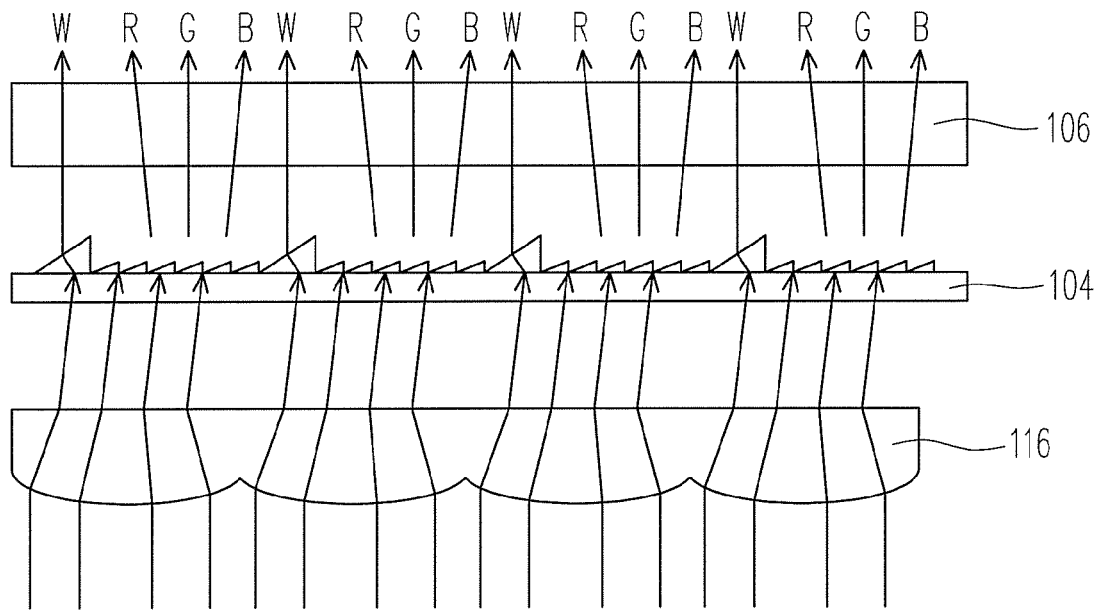

FIGS. 3A-3C are cross-section views, schematically illustrating the application of the composite optical-dividing device with two optical plates in image displaying apparatus, according to an embodiment of the invention. In FIG. 3A, it is similar to the mechanism in FIG. 1 but the micro-structural lens 100 and the prism plate 102 are integrated as an single structure body of optical patch 110. In other words, with the same material, one side is fabricated to form the curving surface of the lens and the other side is directly fabricated to form the needed geometry structure for the prism plate. In this manner, the assembly structure of the optical patch can be simplified and the desired performance can maintain. The curving surface of the micro-structural lens 100 has the capability for condensing the light. The prism plate 102 mainly has a slant surface for providing the deflecting capability. In FIG. 3B, in comparison with the mechanism of FIG. 3A, locations of the micro-structural lens 100 and the prism plate 102 are exchanged in this embodiment. In FIG. 3C, it shows another embodiment with two optical patches. The optical patch 116 is the optical patch 110 in FIG. 3A, which is further modified in accordance with the actual need. The optical patch 116 of this embodiment is integrated as a single body structure, as an example, but one surface of the lens, such as the incident surface, is asymmetric column curving surface and the other surface can, for example, remain a plane without slant portion. The asymmetric column curving surface can simultaneously condense and deflect the incident light. Further for the second optical patch 104, the structure of diffracting grating with slant surface of prism can be implemented on the surface of a substrate. For example, it is on the surface farther to the optical patch 116. Alternatively, it can also be on the lower surface of the substrate. For example, it is on the surface closer to the optical patch 116. Optical performance of both can remain to diffract to the RGB sub-pixel region and deflect to W sub-pixel region.

Figure 4:
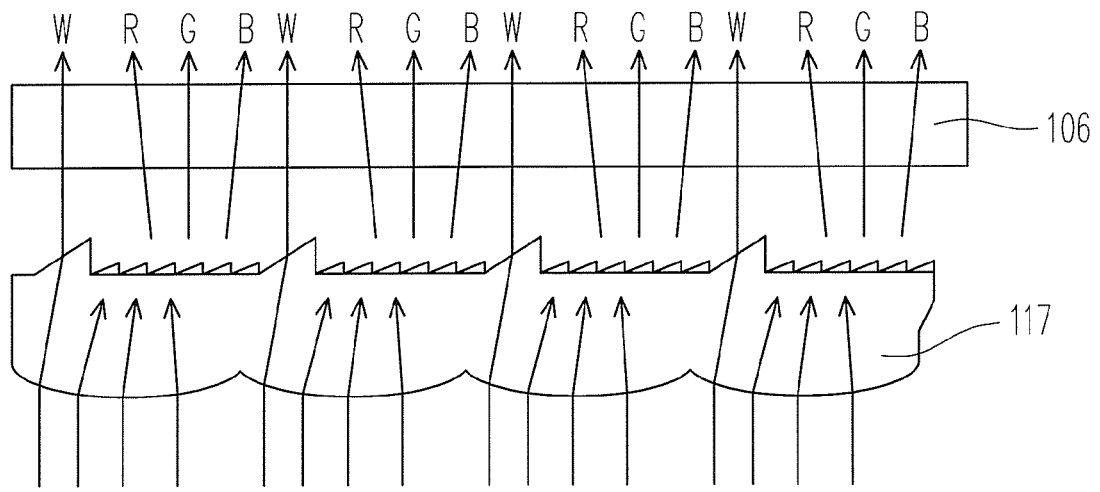
FIG. 4 is a cross-sectional view, schematically illustrating the composite optical-dividing device in application on the image system, according to an embodiment of the invention.

FIG. 4 is a cross-sectional view, schematically illustrating the composite optical-dividing device in application on the image system, according to an embodiment of the invention. In considering the optical patch 104 and the optical patch 116 in FIG. 3C, this embodiment further integrates the foregoing two patches 104 and 116 into a single body structure as an optical patch 117. The single-body optical patch 117 can be, for example, an integration from the optical patch 104 and the optical patch 116 in FIG. 3C together. The grating structure for producing diffraction and the deflecting plane can be directly formed on the other side of the optical patch 116, or the flat plane of the substrate in the foregoing optical patch 116 can be adhered to plane of the optical patch 104. As a result, both structures are integrated as the optical patch 117.

Figure 6A:
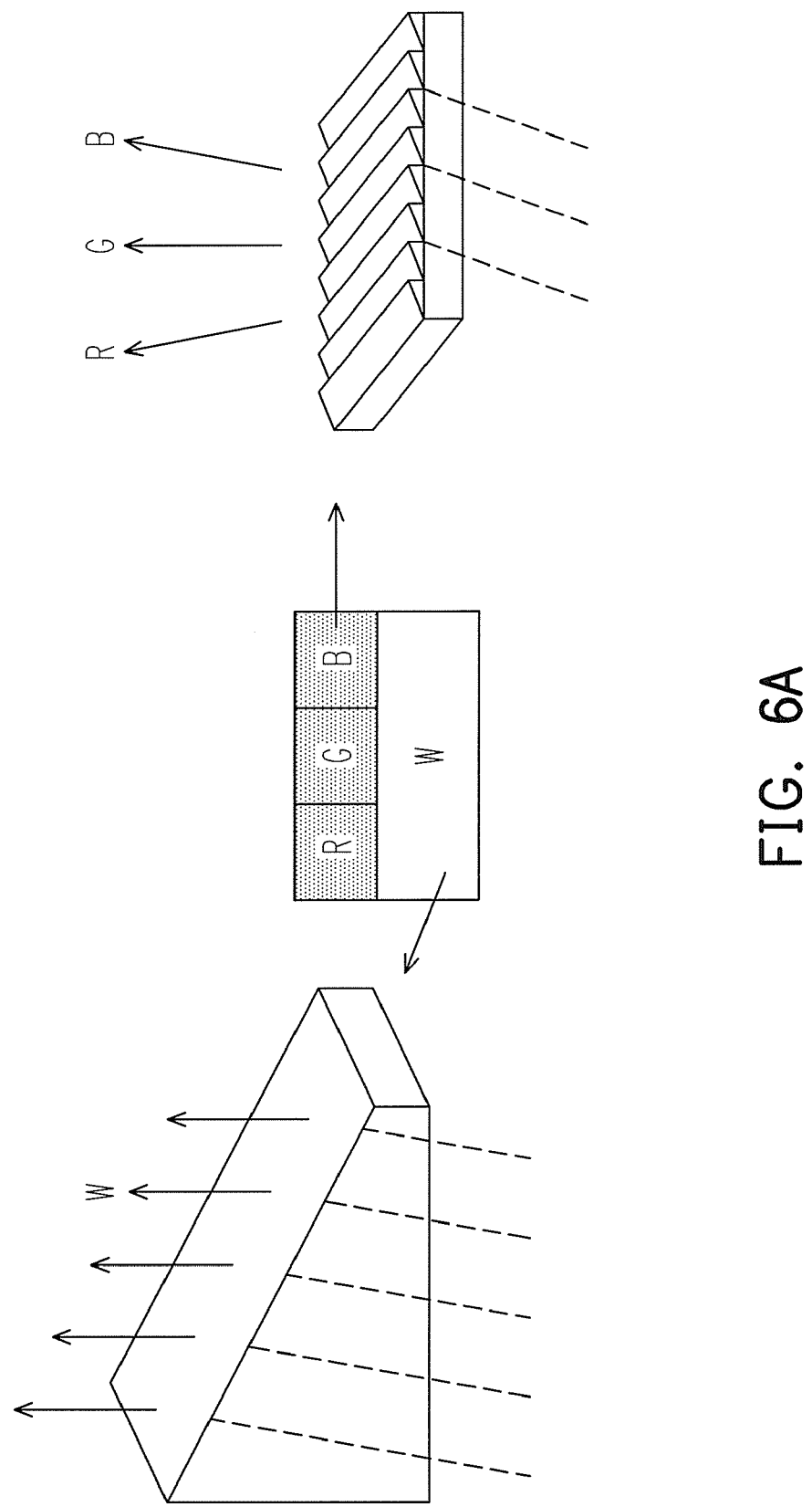
FIGS. 6A-6B are drawings, schematically illustrating schematically illustrating the arrangements between the grating structure and the deflecting slant surface in corresponding to the RGBW sub-pixels for a two-dimensional configuration, according to embodiments of the present invention.
Figure 6B:
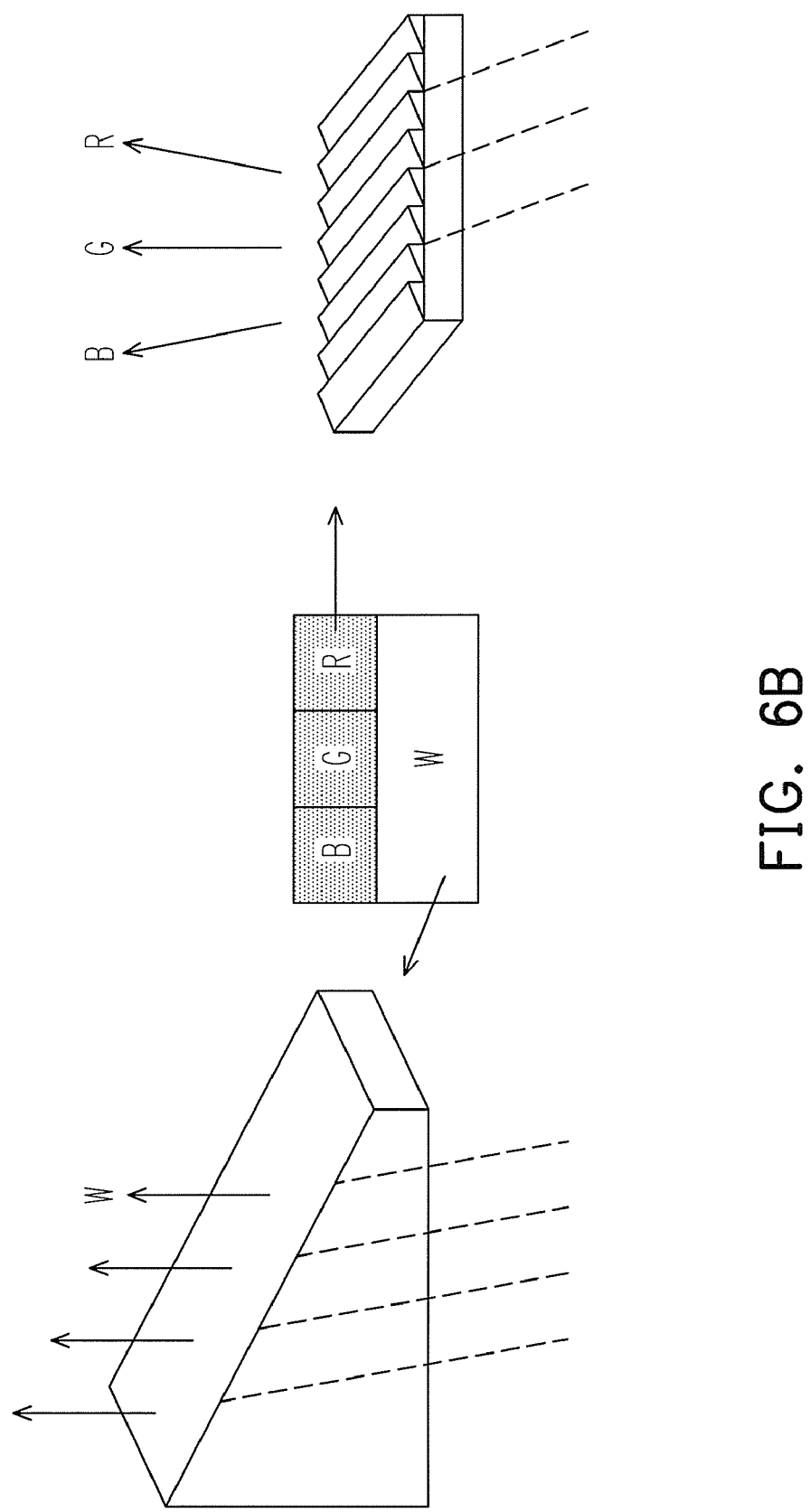

Foregoing types of three patches, two patches or single patch can obtain RGBW in various configurations. FIGS. 5A-5D are cross-sectional views, schematically illustrating the arrangements between the grating structure and the deflecting slant surface in corresponding to the RGBW sub-pixels, according to embodiments of the present invention. As shown in these figures, the distribution sequence of RGB is relating to the diffraction grating structure and the incident direction. The W region is relative simple and is determined by the position of the slant surface. FIGS. 6A-6B are drawings, schematically illustrating schematically illustrating the arrangements between the grating structure and the deflecting slant surface in corresponding to the RGBW sub-pixels for a two-dimensional configuration, according to embodiments of the present invention. Likewise, the distribution sequence of RGB is also relating to the diffraction grating structure and the incident direction. The W region is relative simple and is determined by the position of the slant surface. Further in this example, the W region and the RGB region are about the same area and can be put together in parallel or series. In other words, the W region and the RGB region can have various arrangements depending on the actual need.

Generally, the W region does not need to divide into color lights and is in the form of mixed light as a white light, which can be, for example, used to adjust the brightness of the divided color lights. Therefore, the device at W region needs no the dividing mechanism of grating.

Figure 7A:
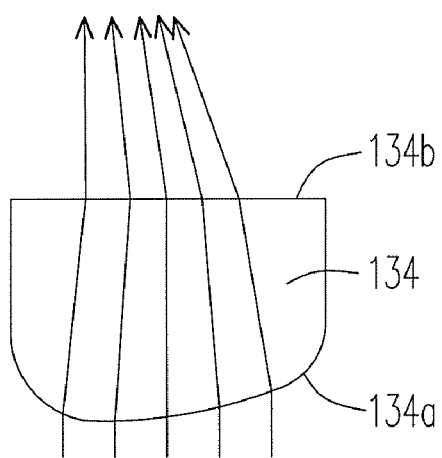
FIGS. 7A-7B are cross-sectional views, schematically illustrating the micro-structure lens.
Figure 7B:
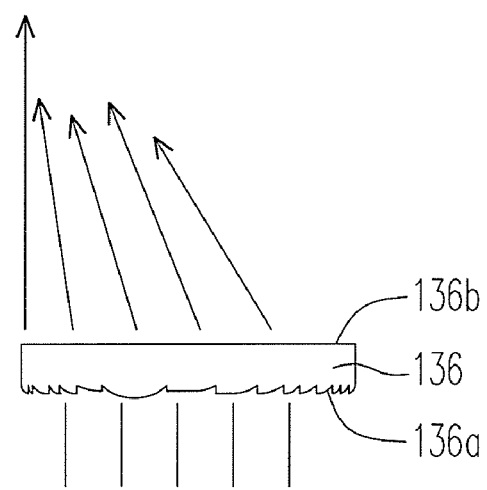

Further with respect to the design of micro-structure lens, the thickness can be reduced based on the thickness-reduced design. FIGS. 7A-7B are cross-sectional views, schematically illustrating the micro-structure lens. In FIG. 7A, the micro-structure lens 134 is, for example, an integrated single body, which has a asymmetric curving surface 134a and a flat surface 134b. The flat surface 134b can be slant or non-slant, in which non-slant is more useful for integrating and alignment with the subsequent other optical patch. However, when the device thickness is in consideration, the structure in FIG. 7A can be further modified to reduce the thickness. In FIG. 7B, the micro-structure lens 136 is taking the structure in FIG. 7 as a base. The flat surface 136b of the micro-structure lens 136 can be the same as the flat surface 134b of the micro-structure lens 134. However, the concavoconvex structure 136a is a corresponding to a smooth curving surface, such as the asymmetric surface 134a. According to the binary optical principle, the smooth curving surface can be cut into a thickness-reduced structure. The micro-structure lens 136 can still have the capability to deflect the light with the condensing effect. As a result, the size may be small and the thickness can be reduced. As a result, the weight and size of the whole system may be reduced. The binary optical principle used herein is described below. In an optical design, lens surface relief can control the optical field distribution after an incident light passes through the lens because the surface relief generates a phase shift of the incident light.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A composite optical-dividing device, receiving a light beam having multiple wavelength bands in mix, the composite optical-dividing device comprising:
   a first optical-patch, having a plurality of micro-structural lenses with same shape, the micro-structural lenses receiving the light beam to produce a deflected light with a condensing degree; and
   a second optical-patch, having a first region and a second region,
   wherein the first region has a plurality of periodic polygonal structures and receives a passing portion of the deflected light to divide the wavelength bands and the divided wavelength bands are deflected onto a specific region in a plane, according to individual wavelengths of the wavelength bands,
   wherein the second region has a polygon structure, receiving a pass portion of the deflected light to deflect onto a specific region on the plane without dividing the wavelength bands.

2. The composite optical-dividing device of claim 1, wherein the passing portion of the deflected light through the first region is divided into red light, green light, and blue light; and the passing portion of the deflected light through the second region is white light.

3. The composite optical-dividing device of claim 1, wherein traveling directions of the wavelength bands divided by the second optical-patch are approximately parallel to a traveling direction of a central wavelength band of the light beam.

4. The composite optical-dividing device of claim 1, wherein the first region and the second region of the second optical-patch are respectively an optical grating and a prism.

5. The composite optical-dividing device of claim 1, wherein the micro-structural lenses of the first optical-patch are implemented respectively corresponding to a plurality of pixels of an array.

6. The composite optical-dividing device of claim 5, wherein each of the micro-structural lenses is an optical structure with a centrally asymmetric micro-structural lens with capability of defecting light, or an aspherical lens.

7. The composite optical-dividing device of claim 1, wherein the first optical-patch and the second optical-patch are an integrated structure with a single optical plate.

8. The composite optical-dividing device of claim 1, wherein the first optical-patch and the second optical-patch are two separated optical plates.

9. The composite optical-dividing device of claim 1, wherein each of the micro-structural lenses of the first optical-patch has a first surface and second surface, so as to simultaneously cause the light beam to have the deflected lights with the condensing degree.

10. The composite optical-dividing device of claim 9, wherein the first surface and the second surface of each of the micro-structural lenses includes a smooth curving surface and a planar surface.

11. The composite optical-dividing device of claim 10, wherein the first surface and the second surface of each of the micro-structural lenses corresponding to a thickness-reduced structure corresponding to a smooth curving surface.

12. The composite optical-dividing device of claim 1, wherein the first region of the second optical-patch is next to the second region substantially in series or parallel.

13. The composite optical-dividing device of claim 1, wherein the diffracted and deflected wavelength bands emitted out from the second optical-patch are providing a color light to each sub-pixel of a displaying apparatus.

14. A composite optical-dividing device, receiving an incident light beam having multiple wavelength bands in mix, the composite optical-dividing device comprising:
   an optical-patch, having a light input surface and a light output surface,
   wherein the light input surface has a plurality of micro-structural lenses with same shape, the micro-structural lenses receiving the light beam to cause condensation and deflection,
   wherein the light output surface has a plurality of periodically polygonal structures, for receiving a first portion of the incident light beam passing through the light input surface so that the wavelength bands are diffracted and divided in spacing according to different wavelength; and receiving a second portion of the incident light beam for deflection the wavelength bands without dividing.

15. The composite optical-dividing device of claim 14, wherein a shape of the micro-structural lenses on the light input surface is a smooth curving surface or a cutting thickness-reduced structure with respect to a smooth curving surface.

16. The composite optical-dividing device of claim 14, wherein the micro-structural lenses are implemented corresponding to a plurality of pixels of a displaying pixel array.

17. The composite optical-dividing device of claim 14, wherein the polygonal structures on the light output surface comprises a prism structure to produce refraction and micro prism to produce diffraction.

18. The composite optical-dividing device of claim 14, wherein the polygonal structures on the light output surface divide, according to the diffraction effect, the incident light beam which passing through the micro-structural lenses; and the other portion of the wavelength bands are deflected, according to refraction effect, and then all the diffracted and deflected lights are going to specific regions on a plane.

19. The composite optical-dividing device of claim 18, wherein the specific regions on the plane are corresponding to a plurality of sub-pixels of a liquid crystal displaying panel.

* * * * *